B. C. SWINEHART.
CUSHION TIRE.
APPLICATION FILED JAN. 13, 1921.
1,394,589.  Patented Oct. 25, 1921.
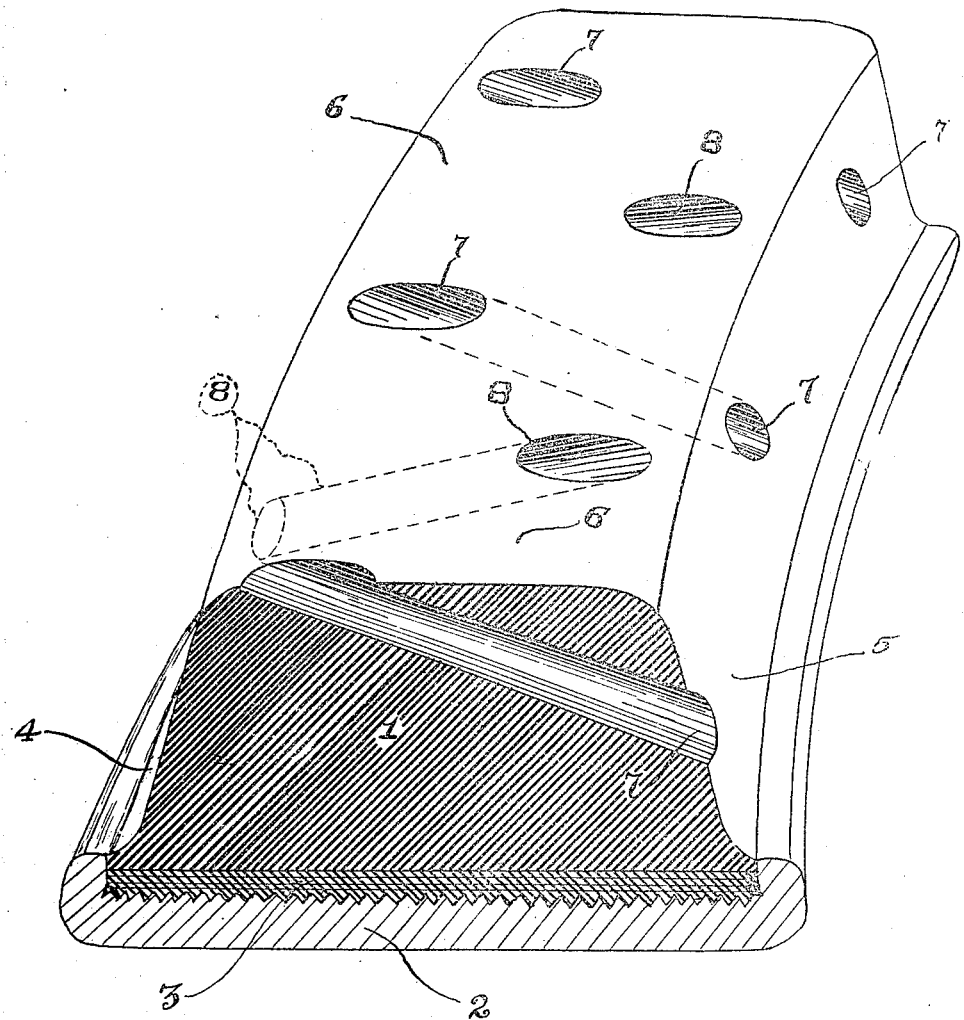

UNITED STATES PATENT OFFICE.

BENJAMIN C. SWINEHART, OF AKRON, OHIO.

CUSHION-TIRE.

1,394,589.

Specification of Letters Patent.

Patented Oct. 25, 1921.

Application filed January 13, 1921. Serial No. 437,024.

*To all whom it may concern:*

Be it known that I, BENJAMIN C. SWINEHART, a citizen of the United States, residing at Akron, in the county of Summit and State of Ohio, have invented new and useful Improvements in Cushion-Tires, of which the following is a specification.

This invention relates to a new and improved cushion tire which may be used on wheels generally, but which is particularly adapted to be employed to advantage on the wheels of self-propelled vehicles.

Objects of the invention are to provide a tire of simple, economical construction which in use will be extremely efficient in absorbing shocks occasioned by the progress of a vehicle over a rough uneven surface.

A further object is to provide an annular elastic tire body provided with a circumferentially extending series of passages which are arranged therein so as to render the body more readily compressible when subjected to a radially directed force.

An additional object is to provide a tire having a plurality of passages or bores extending therethrough from its lateral sides to the peripheral face thereof so as to permit a free circulation of air through said passages and to thereby provide a tire which will not become overheated even though subjected to continuous usage and driven at high speed.

A further object is to provide a tire body having bores arranged therein as above set forth so that dirt, stones, snow, ice or other substance will be automatically expelled therefrom and to further provide a tire having a tread portion which will be extremely efficient in preventing slipping and skidding, even when used sufficiently to wear away a considerable portion thereof.

The above objects are accomplished and additional ends are attained by the novel construction herein described and illustrated in the accompanying drawing in which I have shown a preferred embodiment of the invention, it being understood that various changes may be made in applying the principle herein disclosed and that changes and modifications may be made in the structure shown and described which come within the scope of the claims hereunto appended.

In the drawing, I have shown a single figure which illustrates, in perspective, a portion of an elastic vehicle tire constructed in accordance with this invention and I have employed similar numerals of reference to indicate like or similar parts or things as the same appear therein.

In the drawings, the numeral 1 has been employed to denote an annular elastic body preferably composed of rubber, rubber composition or the like. The numeral 2 is used to indicate a rim which in the particular embodiment of the invention shown constitutes a base ring to which the tire body is secured by vulcanization, there being an intervening layer 3 of vulcanite therebetween. The lateral sides 4 and 5 of the tire body converge from the base ring 3 to a relatively narrow peripheral face 6. The tire body is provided on each lateral side with a circumferentially extending series of regularly recurring passages. Each passage projecting through the body of the tire from the lateral side to the peripheral or tread face thereof. The numeral 7 is used to denote the separate passages or bores in the series of passages extending through the tire body from the lateral face 5 to the tread face 6 thereof and the numeral 8 is likewise employed to designate similar bores in the series of passages which extend through the tire body 1 from the lateral face 4 to the peripheral face 6 thereof. The passages 7 and 8, as shown in the drawing, are in the form of cylindrical bores which project into the tire body in spaced relation to each other at points in spaced relation to the rim 2 and each bore extends upwardly from its respective side of the tire at an angle to the axis of the tire so as to form an elongated opening in the peripheral face 6 at a point in close spaced relation to the opposite side of the tire. The bores 7 and 8 are disposed in the tire so as to alternate with each other and with the axis of the bores 7 inclined at an angle to the axis of the bores 8.

While I have shown and described the passages 7 and 8 of cylindrical form, the passages may be of any desired cross sectional contour and while I have shown a tire body having sloping side walls, it is to be understood that the invention is not thus limited, nor limited to the particular form of rim shown nor to any particular method of fastening the tire body thereto.

It will thus be seen that I have provided a strong, durable tire of simple, economical construction which in use will constitute an extremely effective cushion which may be used on the wheels of vehicles without danger of slipping or skidding.

Having thus described my invention, I claim as new and desire to secure by Letters-Patent:—

1. A cushion tire comprising an annular elastic body provided with holes extending therethrough from its lateral sides to the peripheral face thereof.

2. A tire of the class described, comprising an annular elastic body provided on each lateral side with a circumferentially extending series of regularly recurring holes which project therethrough to the peripheral face thereof.

3. A tire of the class described comprising an annular elastic body provided on each lateral side with a circumferentially extending series of regularly recurring holes which project therethrough and terminate in the peripheral face thereof at points adjacent the opposite side of the tire body.

4. A tire of the class described comprising an annular elastic body having a wide base, inclined lateral sides and a relatively narrow peripheral face and provided on each lateral side with a circumferentially extending series of regularly recurring holes projecting therethrough to the peripheral face thereof.

5. A cushion tire provided with a plurality of holes, each extending therethrough from its tread face to a lateral side thereof, the holes in the tread face alternately disposed adjacent opposite edges thereof and alternately directed to opposite sides of the tire.

In testimony whereof I have hereunto set my hand.

BENJAMIN C. SWINEHART.